United States Patent
Choi et al.

(10) Patent No.: US 7,298,445 B1
(45) Date of Patent: Nov. 20, 2007

(54) FAST RESPONSE LIQUID CRYSTAL MODE

(75) Inventors: Wing Kit Choi, Taipei (TW);
Shin-Tson Wu, Oviedo, FL (US)

(73) Assignee: Research Foundation of the University of Central Florida, Orlando, FL (US)

(*) Notice: Subject to any disclaimer, the term of this patent is extended or adjusted under 35 U.S.C. 154(b) by 280 days.

(21) Appl. No.: 10/874,481

(22) Filed: Jun. 23, 2004

Related U.S. Application Data

(60) Provisional application No. 60/480,622, filed on Jun. 23, 2003.

(51) Int. Cl.
*G02F 1/1343* (2006.01)

(52) U.S. Cl. ...................... 349/141; 349/139

(58) Field of Classification Search ............... 349/141, 349/139
See application file for complete search history.

(56) References Cited

U.S. PATENT DOCUMENTS

| | | | |
|---|---|---|---|
| 5,128,786 A | 7/1992 | Yanagisawa | 359/67 |
| 5,179,460 A | 1/1993 | Hinata et al. | 359/88 |
| 5,377,027 A | 12/1994 | Jelley et al. | 359/48 |
| 5,781,259 A | 7/1998 | Shinomiya et al. | 349/88 |
| 6,005,650 A * | 12/1999 | Kim et al. | 349/130 |
| 6,031,593 A | 2/2000 | Morikawa et al. | 349/155 |
| 6,724,454 B2 * | 4/2004 | Kim et al. | 349/141 |
| 6,882,395 B2 * | 4/2005 | Liu | 349/141 |
| 6,924,876 B2 * | 8/2005 | Kubo et al. | 349/193 |

OTHER PUBLICATIONS

"Electro-Optical Performance of a Vertically Aligned LCD Mode Using Electrically Controlled Self-Compensation," W. Lui et. al, SID Digest, 1998, pp. 319-321.
"Electro-Optic Characteristic of Fringe-Field Switching Mode Depending on Rubbing Direction," S.H. Hong et. al, Journal of Applied Physics vol. 39, No. 6A, Jun. 1, 2000, pp. 527-530.
"Bend Transition in Pi-cell," H. Nakamura et. al, Journal of Applied Physics vol. 39, No. 11, Nov. 11, 2000. pp. 6368-6375.

* cited by examiner

*Primary Examiner*—Michael H. Caley
(74) *Attorney, Agent, or Firm*—Brian S. Steinberger; Phyllis K. Wood; Law Offices of Brian S. Steinberger, P.A.

(57) ABSTRACT

A novel nematic liquid crystal (LC) mode is based on the Fringing-Field-Switching of Vertically-Aligned liquid crystals. The VA-FFS mode is capable of generating very fast optical modulation without the use of very thin cell gap. IA major feature of this LC mode is that it has unusual fast relaxation time compared with the conventional nematic LC modes that require a thin cell gap. This fast relaxation occurs even at very low applied voltages and the operation is very stable. The fast-response mechanism of this LC mode involves the confinement of liquid crystal molecular switching within self-imposed thin LC layers. The present invention provides a novel approach to overcome the fundamental problem of the long relaxation time of the conventional nematic liquid crystal modes.

14 Claims, 23 Drawing Sheets

Fig. 8
(Prior Art)
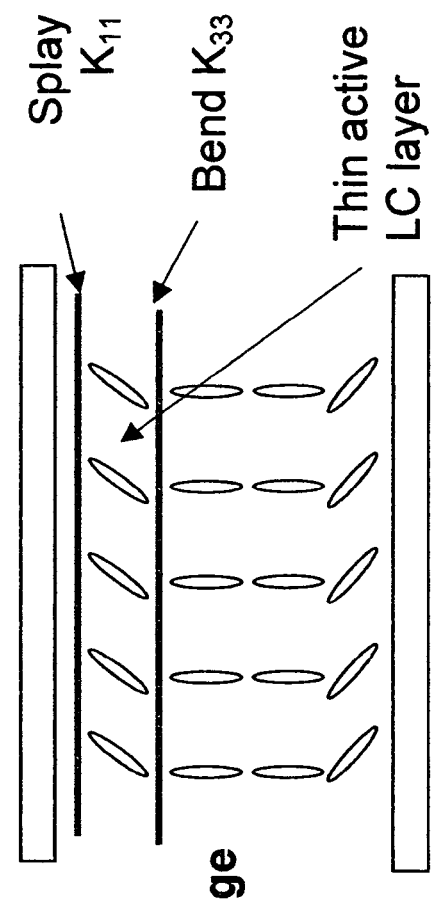
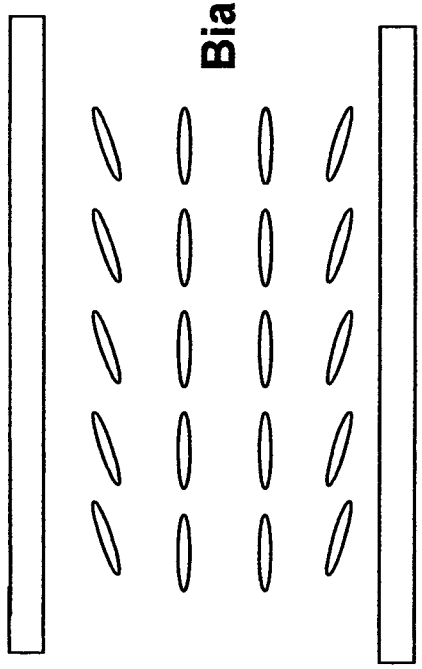

FAST RESPONSE LIQUID CRYSTAL MODE

This invention claims the priority of U.S. Provisional Application Ser. No. 60/480,622 filed Jun. 23, 2003 and was supported in part by Department of Defense Advanced Research Project Agency (DARPA) and Raytheon Electronic Systems under Contract No. 65-04-878.

FIELD OF THE INVENTION

This invention relates to a liquid crystal operation mode, and in particular to methods and apparatus for producing a stable and fast-response optical modulator for use in optical communications and advanced display systems.

BACKGROUND AND PRIOR ART

Due to the slow response of nematic liquid crystals (typically 25 milliseconds (ms) to 100 ms), applications for nematic liquid crystals today have been mainly limited to those with relatively low data rates. This shortcoming is caused by the fact that the switching speed of nematic liquid crystals is often limited by its long relaxation time. Unlike the switching-on process, which is electric-field driven, the relaxation process (i.e. switching-off) is not electric-field driven and is generally a much slower process. This relaxation process is slower in a thicker cell since the restoring force provided by the alignment layers (substrate surfaces) to the bulk is weaker in a thick cell. In order for liquid crystal devices to switch at high speed, i.e. with short relaxation time, one often needs to use very thin cell gap (e.g. <2 µm) such that the restoring force provided by the alignment layers remains very high in the bulk of the liquid crystal. This thin cell gap however increases fabrication difficulty, especially when the panel size is large, and also limits the potential optical retardation since cell gap is limited. It is therefore anticipated that if a nematic liquid crystal mode capable of achieving very fast response (e.g. <5 ms) without the use of thin cell gap can be realized, it can greatly advance the development of high-speed applications in various areas such as those in optical communication systems (e.g., optical phase modulators) and advanced display systems, e.g., color sequential displays and television (TV) displays. Although a liquid crystal mode, known as Pi-cell Bend mode or Optically Compensated Bend (OCB) mode, capable of generating very fast response without the use of thin cell gap has been reported, this liquid crystal mode is unstable and requires a constant bias voltage.

With regard to Fringing-Field-Switching mode (FFS), the electrode design in the present invention is very similar to the FFS mode, as shown in FIG. 6, which was proposed by researchers in Korea for obtaining high efficiency wide-viewing-angle liquid crystal displays. The FFS mode developed in Korea has Parallel-Alignment (PA) at the off-state which leads to much slower response since the LC molecules in the whole bulk layer also switch without the restriction of the boundary effects, and the restoring force is mainly governed by the elastic constant $K_{22}$ which is small. See "Fringing-Field-Switching mode (FFS)", Seung Hong et al, *Japanese Journal of Applied Physics*, Vol. 39, p. L527, 2000.

Vertical-Alignment-In-Plane-Switching (VA-IPS) is discussed by W. Liu et al, in *SID Digest '98*, p. 319, 1998. Researchers proposed the VA-IPS mode which combined VA alignment with IPS electrode design. The VA-IPS mode can achieve a wide-viewing angle property but the response time is not very fast. A major difference between VA-IPS and the present invention is that the gap l between the positive and negative electrode is much larger in VA-IPS mode as shown in FIG. 7 whereas l is almost zero in the present invention (separated by a passivation layer only). Therefore the electric field in the VA-IPS mode is much more spread out and less localized which results in large switching of LC bulk layer and hence small boundary effect and slower response time.

Another liquid crystal mode of interest is the Optically Compensated Bend mode (OCB) discussed in *Japanese Journal of Applied Physics*, Vol. 39, Part 1, No. 11, H. Nakamura et al, p. 6368-6375, (2000). OCB is a liquid crystal mode that can generate very fast response without the use of very thin cell gap or special driving conditions. At off-state, this mode has Parallel Alignment (PA) with opposite top and bottom pre-tilts as shown in FIG. 8. Under a certain bias voltage, the molecules in the bulk are switched to vertical. Modulation of electric field above this bias voltage causes switching of the molecules near the boundaries. The OCB liquid crystal mode has very thin active LC layers and very strong boundary effects due to $K_{33}$ and $K_{11}$ as shown in FIG. 8. The OCB mode is however rather unstable since it involves the Splay to Bend transition and it also requires a constant bias voltage.

The following patent references are related to the use of liquid crystal display devices, but have no mention to Fringing Field Switching mode for Vertically Aligned liquid crystals.

U.S. Pat. No. 5,128,786 to Yanagisawa describes a LC display device wherein the image elements are arranged like a matrix with discontinuous electrodes. U.S. Pat. No. 5,179,460 to Hinata et al. discloses an input structure for a LC display that prevents electrode peeling and eliminates bending stresses and cracks in the electrode. U.S. Pat. No. 5,377,027 to Jelley describes a light-emitting LC display wherein a matrix area separates pixels. U.S. Pat. No. 5,781,259 to Shinomiya et al. describes another LC display device with transparent substrates, transparent pixels and transparent electrodes, the transparent pixels are separated from polymer portions with a shielding layer of metal foil. U.S. Pat. No. 6,031,593 to Morikawa et al. describes a spacing layer for LC display using light shielding layer. Pixels are formed with flattened film in between to suppress disclination. None of the references suggest a configuration that uses self-imposed boundary layers by vertically aligned liquid crystals. Commercial demand is very strong for fast response, stable and easily fabricated liquid crystal devices.

The present invention provides a novel liquid crystal mode capable of producing very fast response, due to fast relaxation time, without the use of thin cell gap is disclosed. This invention is very stable and has very short relaxation time even at low voltages.

SUMMARY OF THE INVENTION

The first objective of the present invention is to provide a fast-response liquid crystal modulator.

The second objective of the present invention is to provide a fast-response liquid crystal modulator based on the use of Fringing-Field-Switching (FFS) to the Vertical Aligned (VA) liquid crystals (denoted by VA-FFS).

The third objective of the present invention is to provide a fast-response liquid crystal modulator without the use of thin cell gap.

The fourth objective of the present invention is to provide a fast-response liquid crystal modulator with self-imposed strong boundary layers such that very fast relaxation occurs even in a thick cell.

The fifth objective of the present invention is to provide a fast-response liquid crystal modulator with high stability.

The sixth objective of the present invention is to provide a fast-response liquid crystal modulator even at low operating voltage.

Further objects and advantages of this invention will be apparent form the following detailed description of a presently preferred embodiment, which is illustrated, schematically in the accompanying drawings.

BRIEF DESCRIPTION OF THE FIGURES

FIG. 8 shows the structure of the Optically Compensated Bend mode (OCB) (Prior Art)

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Acronyms used throughout the description of the present invention are defined as follows:

G—pixel electrode gap measured in micrometers (μm)
LC—liquid crystal
OCB—Optically Compensated Bend liquid crystal mode requires continuous application of bias voltage.
PA—Parallel Alignment of liquid crystals
TN—Twisted Nematic liquid crystals
VA-FFS—Vertical Alignment Fringing Field Switching liquid crystal mode of the present invention uses very low voltage, e.g., <5V.
VA-IPS—Vertical Alignment In Plane Switching liquid crystal mode
W—pixel electrode width measured in micrometers (μm)

Figure 1:
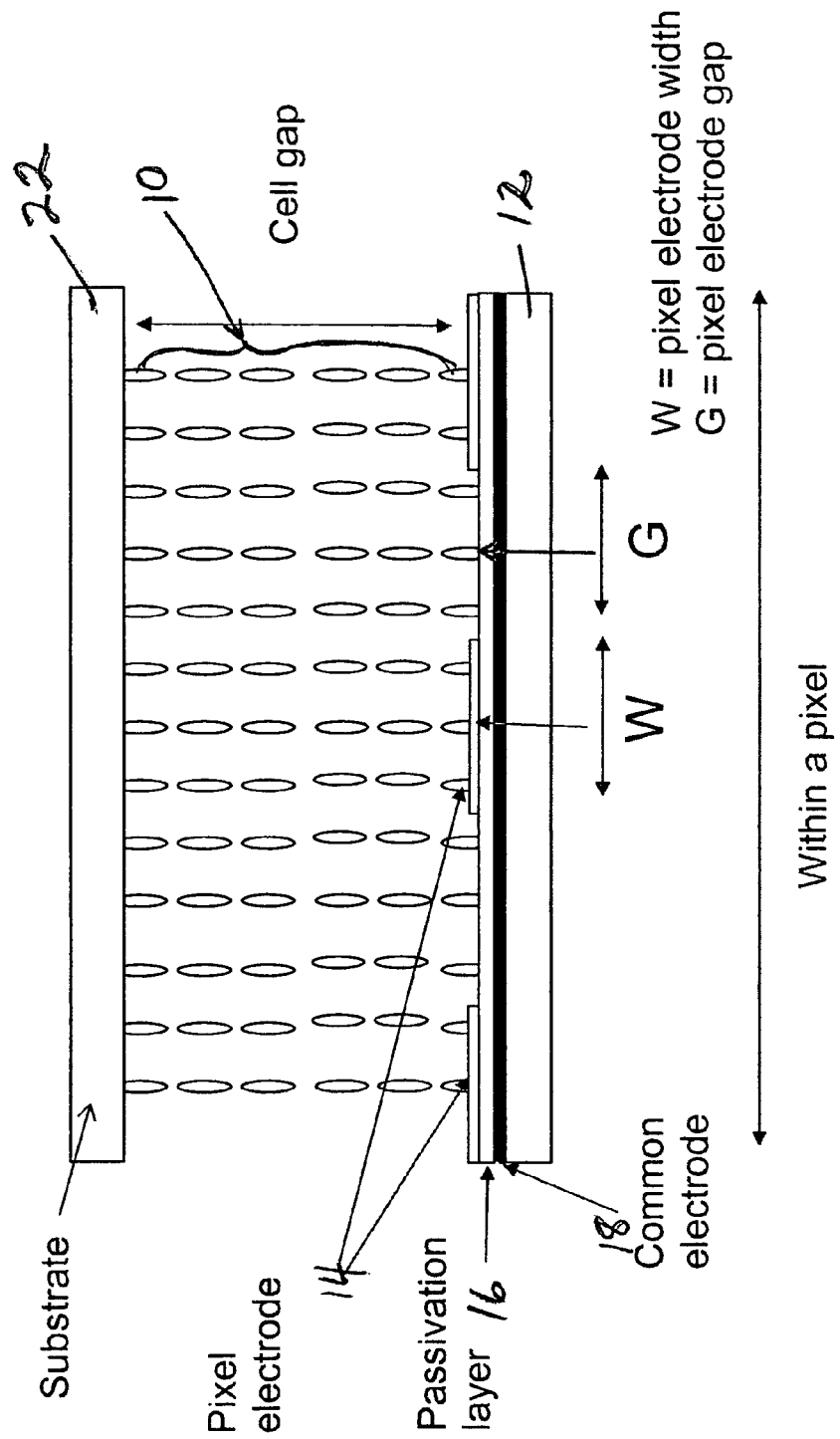
FIG. 1 shows the structure of the liquid crystal mode (VA-FFS) in the present invention at "off state" with no applied voltage.
Figure 2:
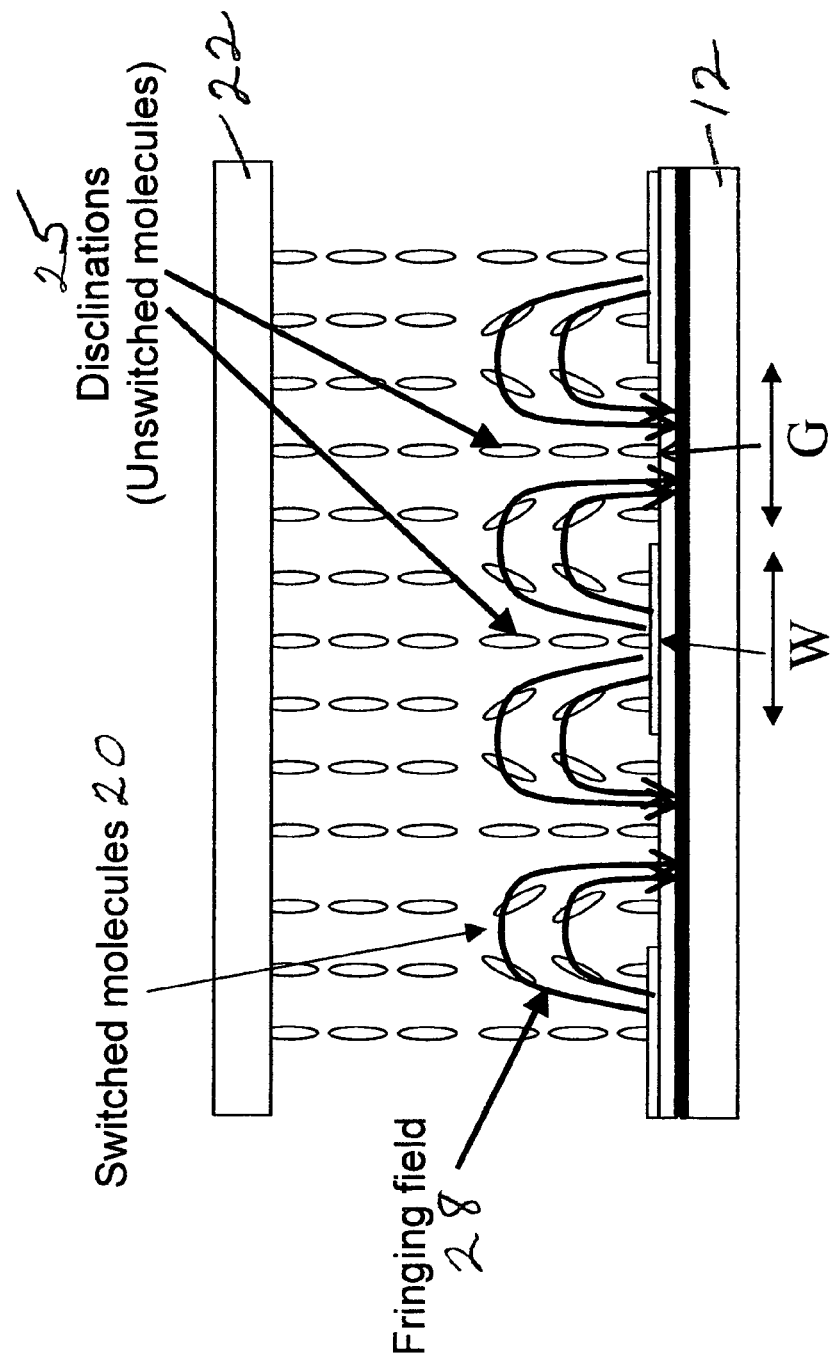
FIG. 2 shows the structure of the liquid crystal mode (VA-FFS) in the present invention at "on state" with an applied voltage.

The operating principle of the liquid crystal mode in the present invention is based on the Fringing-Field Switching (FFS) of Vertically-Aligned (VA) liquid crystals; this novel mode is hereinafter denoted as VA-FFS. The structure of this liquid crystal mode is shown in FIG. 1. Liquid crystal molecules 10 are sandwiched between a top substrate 22 and a bottom substrate 12. The alignment of the liquid crystal molecules 10 is vertical at the "off state" where there is no applied voltage. The transmission is thus zero when the device is placed between crossed polarizers since there is no birefringence experienced by the incident light. In the bottom substrate 12, the pixel electrode 14 next to the liquid crystal layer consists of discontinuous and narrow segments. These pixel electrode segments within one pixel are all connected to the same voltage source via a thin-film transistor. This pixel electrode 14 is separated from the bottom common electrode 18 (could be ~0V) by a passivation layer 16. The passivation layer 16 is usually silicon dioxide or any other commonly known insulation material and it is used as insulation between the pixel electrode 14 and the common electrode 18. The width of each pixel electrode segment will be denoted by W and the width of the gap between adjacent segments will be denoted by G as shown in FIG. 1. Discontinuous and narrow segments of a pixel electrode for the present invention are in a range from approximately 1 micrometer (μm) to approximately 10 micrometers (μm); preferably between approximately 2 μm to approximately 7 μm. When the voltage of the pixel electrode 14 is switched on, e.g. from 0V to 5V, an electric field pattern 28 is generated as shown in FIG. 2. This electric field switches the vertically aligned molecules and generates a bright state between crossed polarizers. The switched molecules relax back to the original state when the applied voltage is removed. It is found that the relaxation time of this liquid crystal mode becomes exceedingly fast, e.g., in a range from 1 millisecond to 3 milliseconds (ms) when W and G of the pixel electrode become very narrow, e.g. 3 μm or below. Although, in general, W and G can have different values, through simulations it has been found that highest light efficiency is usually obtained when W and G are equal. For example, when W=G=3 μm, both rise and fall (relaxation) times are often as short as 3 milliseconds (ms) or below. Moreover, these fast responses can occur at a relatively low voltage, e.g. 2-5 Volts (V), and in a thick cell (e.g. 5-5 μm). These unusual fast responses suggest that this novel liquid crystal mode can have significant potential for low voltage, fast response, nematic liquid crystal modulators.

The mechanisms for the unusual fast response involve strong boundary effects provided by disclinations ($K_{11}$) and strong boundary effects provided by substrate surface ($K_{33}$).

Figure 3:
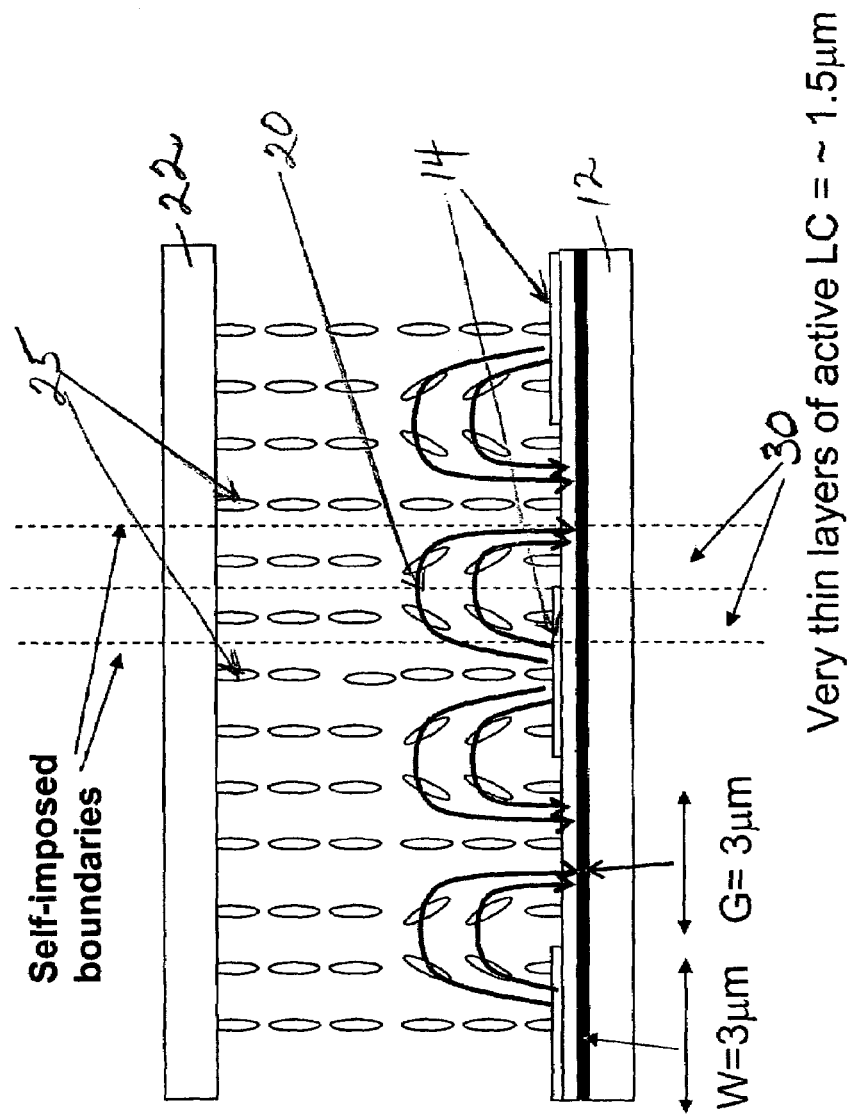
FIG. 3 shows the switching of molecules occurs only within very thin layers of liquid crystals, which are generated as a result of disclinations.

As shown in FIG. 2, due to the interaction of LC molecules with the generated electric field, regular disclinations 25, also known as "unswitched molecules," exist above the pixel electrode. These disclinations 25 cause the switching of LC molecules 20 to be confined within very thin layers or horizontal sections that are perpendicular to the vertically aligned LC molecules. For example, when W=G=3 μm, LC molecules are only allowed to switch within 1.5 μm layers of LC as shown in FIG. 3. The LC layers 30 are so thin that the majority of the LC molecules are influenced and governed by the adjacent disclinations 25. The disclinations 25 act as strong boundaries which induce very high restoring forces (due to elastic constant $K_{11}$) on the switched LC molecules 20 after the removal of an applied voltage and result in very fast relaxation. This is very similar to the mechanism for the fast response, which occurs in LC devices with very thin cell gap since a majority of the molecules in these devices are strongly controlled and influenced by the boundary (alignment) layers. This is justified by the fact that the relaxation time of the LC mode in this invention remains very fast even after the removal of a very small voltage, e.g. 2V.

Figure 4:
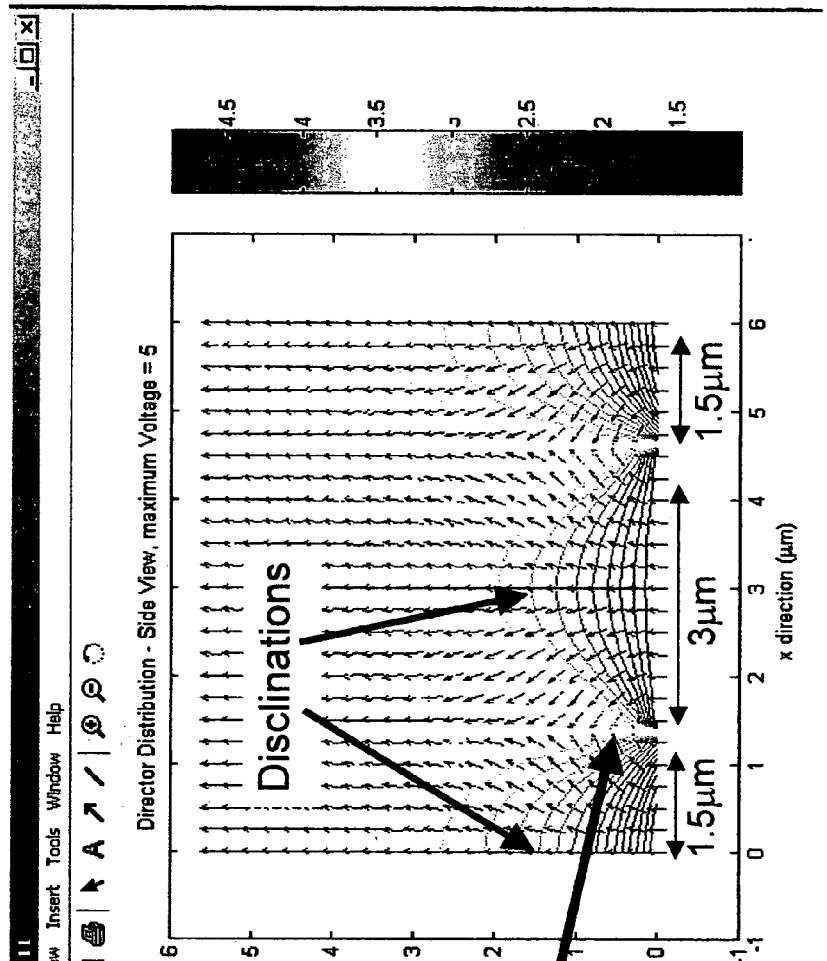
FIG. 4 shows the switching of LC, which is much larger near the substrate surface.

Referring now to the strong boundary effects provided by a substrate surface (due to elastic constant $K_{33}$). In FIG. 3, substrate surface 12 supports pixel electrode 14 and when W and G of the pixel electrode become very small, most of the electric field generated is concentrated near the electrode, i.e. the electric field is much stronger near the surface of the substrate 12. Therefore, the extent of the LC switching (i.e. angle of rotation) is much larger near the substrate surface than in the bulk as shown in the simulated director distribution in FIG. 4. The relaxation speed of these molecules is thus further enhanced by the strong elastic force due to $K_{33}$ provided by the boundary layer (alignment layer) on the substrate surface. The relaxation process of this type of LC mode where the switching occurs mainly near boundaries, similar to the OCB liquid crystal mode, is in general much faster compared with LC modes where the molecules in the bulk also switch significantly.

Figure 5:
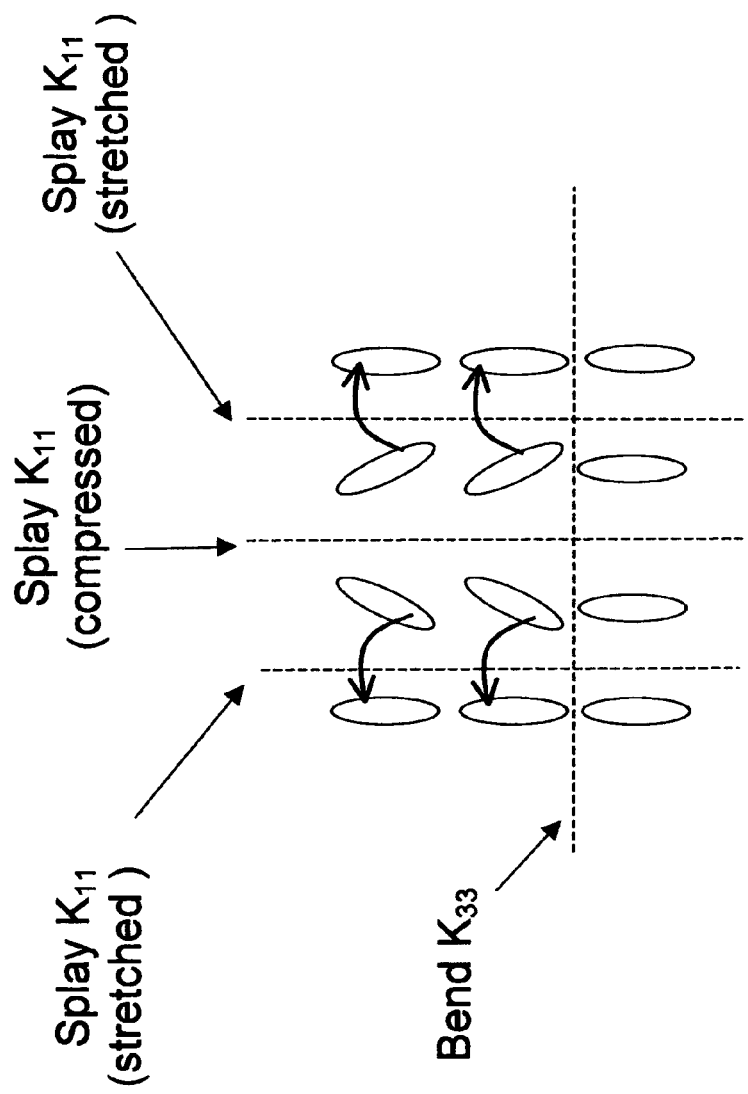
FIG. 5 shows the elastic forces and the boundaries responsible for the very fast relaxation.
Figure 6:
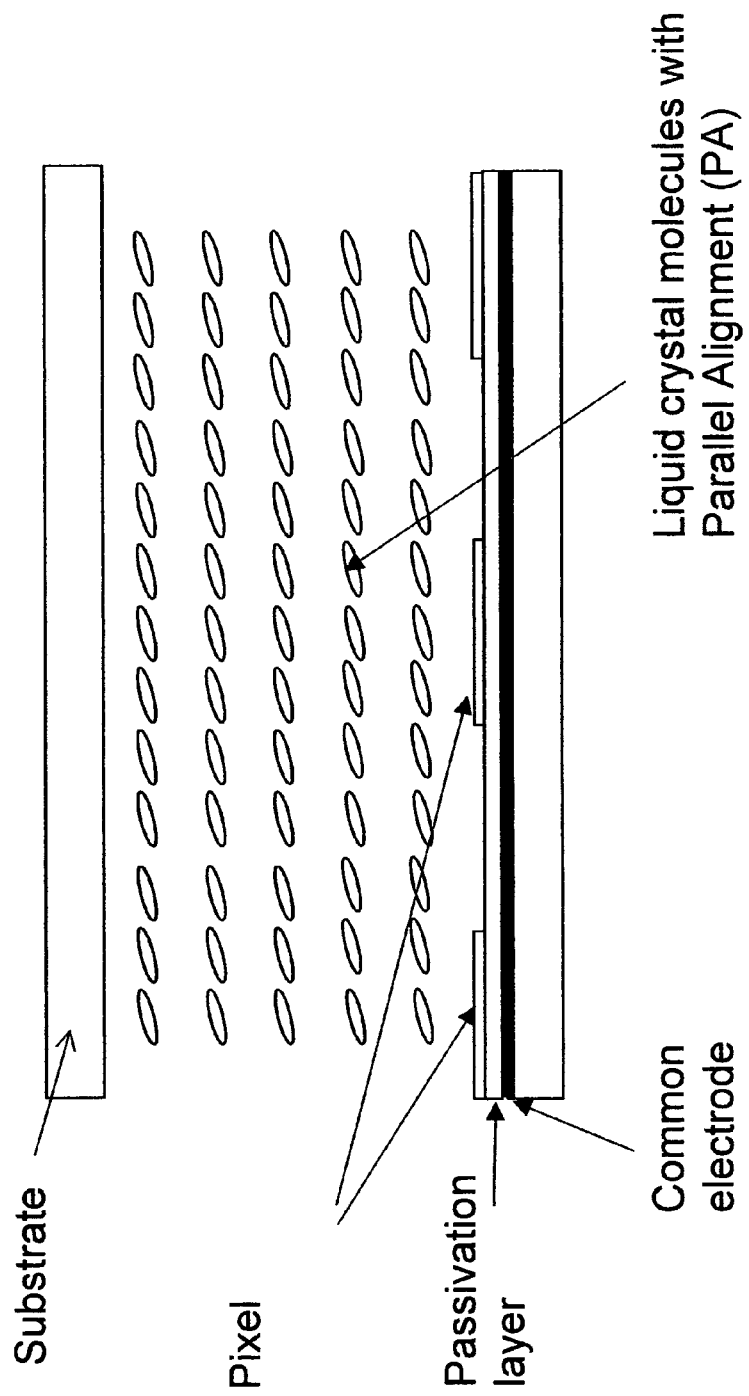
FIG. 6 shows the structure of the Fringing-Field-Switching mode (FFS) at off-state. (Prior Art)
Figure 7:
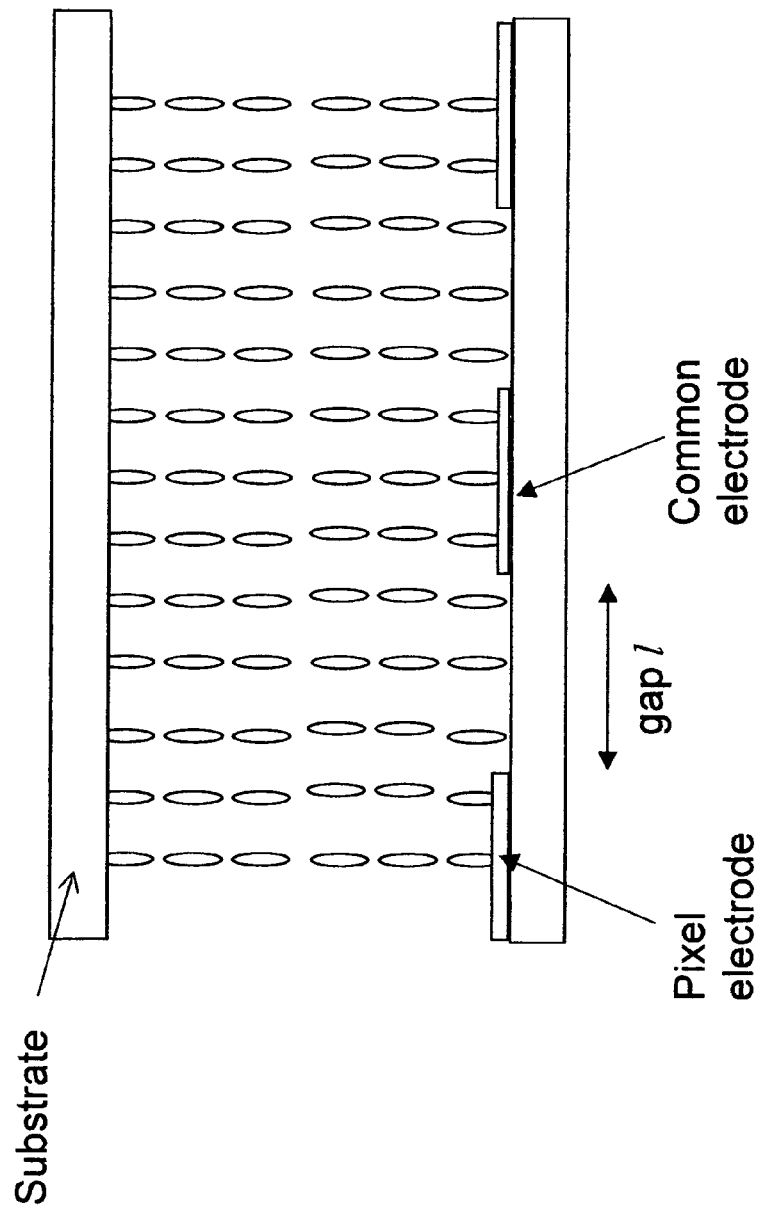
FIG. 7 shows the structure and switching of Vertical-Alignment-In-Plane-Switching (VA-IPS). (Prior Art)

FIG. 5 summarizes the elastic forces and boundaries around the switched molecules responsible for this fast response mode. The switched molecules shown in FIG. 5 correspond to the active LC layers 30 shown in FIG. 3. $K_{11}$ and $K_{33}$ are elastic constants that correspond to different types of elastic forces exerted on the active molecules. $K_{11}$ tends to be along the longer, vertical axis of the molecule and $K_{33}$ tends to be along the shorter, horizontal axis of the molecule. Splay and Bend are the technical names used to distinguish the different types of elastic forces. Thus, Bend $K_{33}$ represents elastic forces in a horizontal direction and Splay refers to the elastic forces in a vertical direction. Compressed Splay occurs when the molecules are squeezed against each other and Stretched Splay occurs when the molecules are being pulled apart. In both cases, compressed and stretched splay, the movement creates an elastic force along the vertical length of the molecule.

Below are further embodiments that can enhance the efficiency or brightness of a device using the present invention.

Figure 9:
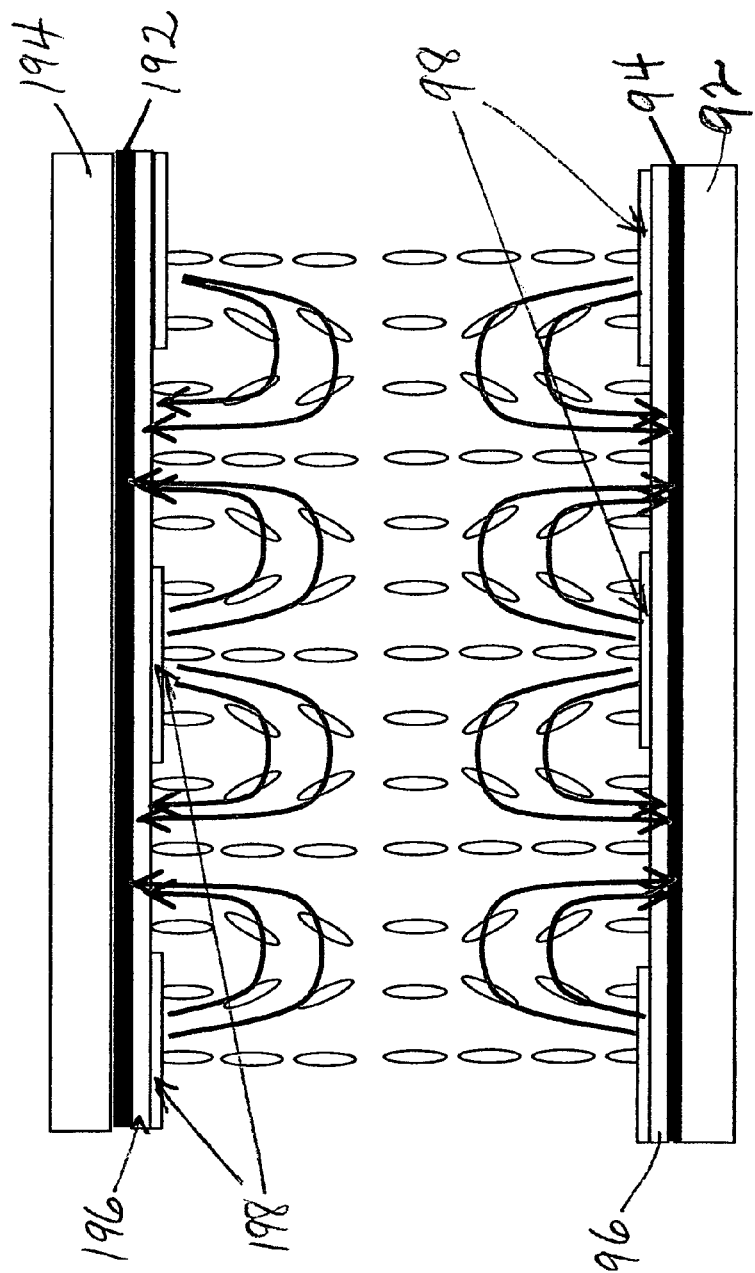
FIG. 9 shows the use of symmetric upper and lower electrode configuration in our present invention that can lower the operating voltage.

One embodiment uses symmetrical upper and lower electrodes as shown in FIG. 9. In a lower stacked arrangement, a first substrate 92 is adjacent to a common electrode 94 adjacent to a passivation layer 96 that is adjacent to a discontinuous pixel electrode 98. Opposite and symmetrically aligned is an upper stacked arrangement having a second substrate 192, adjacent to a second common electrode 194, adjacent to a second passivation layer 196 attached to a second discontinuous pixel electrode 198. This configuration can lower the required voltage to attain a certain transmission compared with the lower electrode only configuration shown in FIG. 1.

Figure 10:
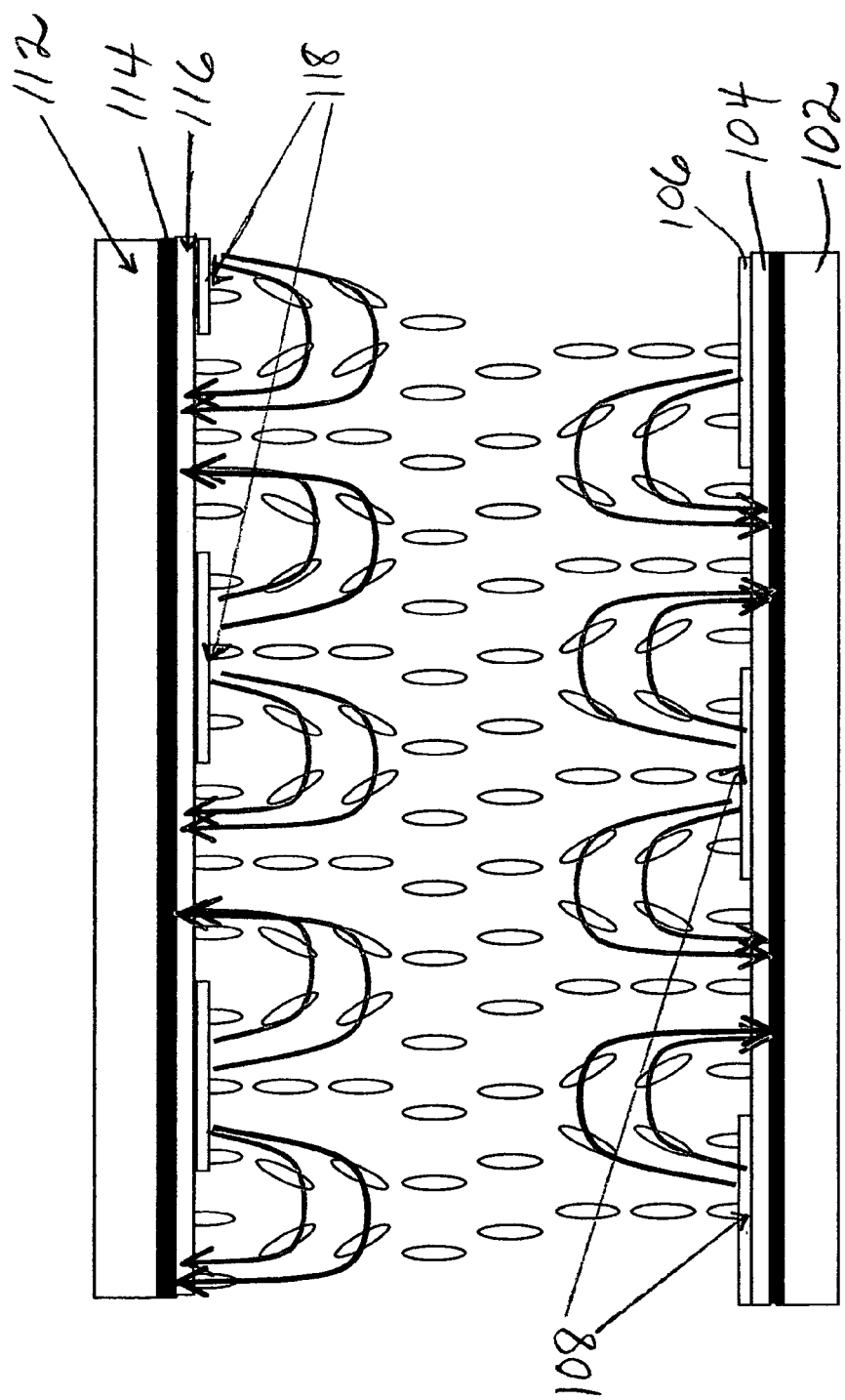
FIG. 10 shows the use of asymmetric upper and lower electrode configuration in our present invention that can achieve maximum possible transmission.

Another embodiment uses asymmetric upper and lower electrodes as shown in FIG. 10. In a lower stacked arrangement, a first substrate 102 is adjacent to a common electrode 104, adjacent to a passivation layer 106 that is adjacent to a discontinuous pixel electrode 108. Opposite and asymmetrically aligned is an upper stacked arrangement having a second substrate 112, adjacent to a second common electrode 114, adjacent to a second passivation layer 116 attached to a second discontinuous pixel electrode 118. This configuration allows the transmission to increase significantly since the switched LC molecules in the upper electrode compensate for the unswitched LC molecules (disclinations) in the lower electrode, thus increases the maximum possible transmission.

Simulation results for each of the embodiments of the VA-FFS liquid crystal mode of the present invention are shown in FIGS. 11 to 23.

Figure 11:
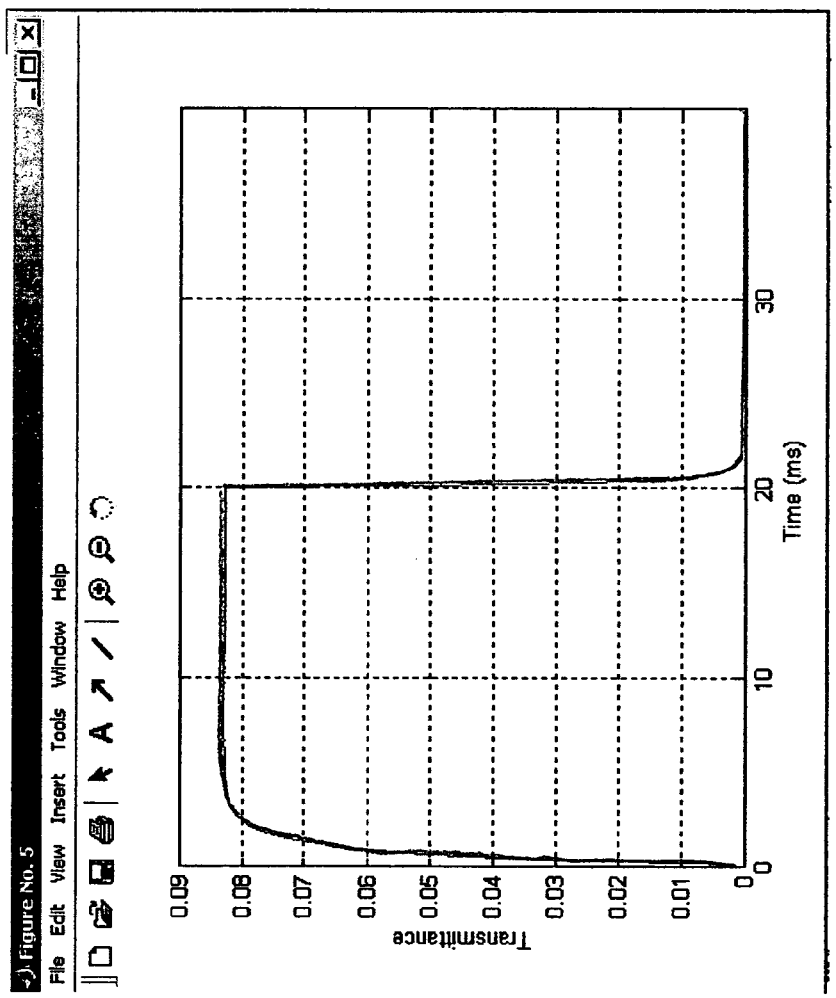
FIG. 11 shows a simulation of the optical response of the present invention with lower electrode only.

FIG. 11 shows the simulation result of the optical response of a 5.5 μm thick VA-FFS (with lower electrode only) device to an applied voltage of 5V. The liquid crystal has birefringence (Δn) of 0.2 whereas other physical properties are taken the same as LC ZLI-4535, the product code for a liquid crystal that is commercially available from Merck, Inc. ($K_{11}$=9.3 pN, $K_{22}$=5.9 pN, $K_{33}$=11.8 pN and Δε=14.8). The device has W=G=3 μm. The transmission of this cell is not so high, ~8.5%, which is about 8.5/35=~24%. The transmission is divided by 35 since 35 corresponds to 100% normalized transmission of the conventional twisted nematic (TN) cell. However, the response times are unusually fast. The rise time is <3 ms and the fall time is <1 ms. Moreover, this happens at a relatively low voltage of 5V.

Figure 12:
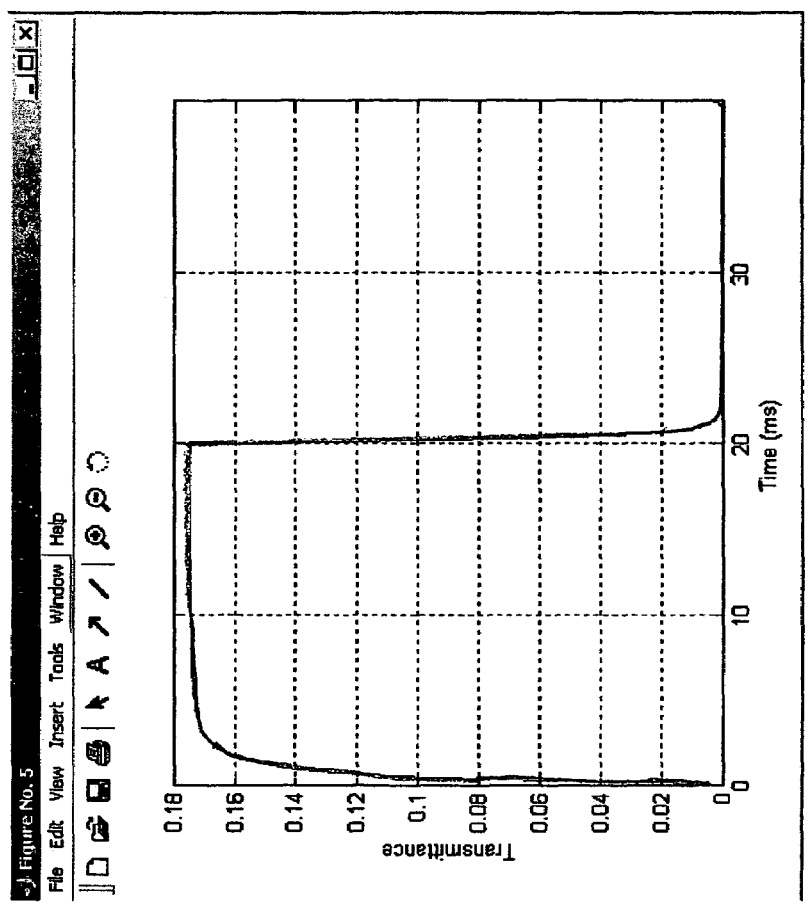
FIG. 12 shows a simulation of the optical response of the device in FIG. 11 after using a higher birefringence of liquid crystal and result in higher transmission.

By using higher birefringence liquid crystal, one can increase the transmission of the device in FIG. 11. For example, by using Δn of 0.4, the transmission is approximately doubled to 17.5%, which is 50% of TN as shown in FIG. 12.

Figure 13:
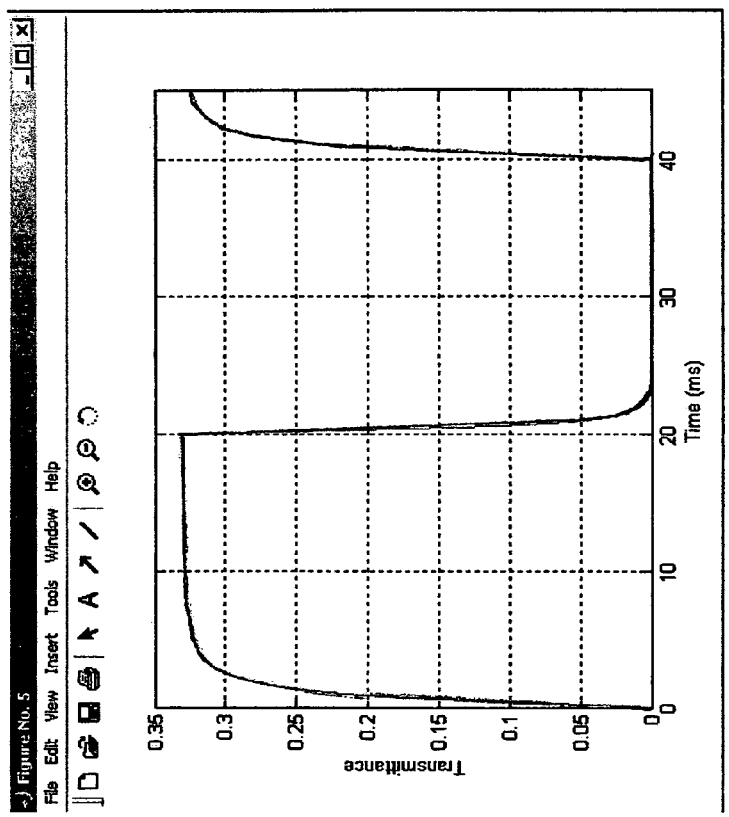
FIG. 13 shows a simulation of the optical response of the present invention with asymmetric upper and lower electrode.

By using asymmetric upper/lower electrode, the potential transmission can be maximized. For example, the transmission of a device with asymmetric upper and lower electrodes is ~33.5/35%=~96% at 6V with LC Δn=0.4 as shown in FIG. 13. Other LC physical parameters are $K_{11}$=12 pN, $K_{22}$=6 pN, $K_{33}$=16 pN and Δε=10. Cell gap of the device was 15 μm thick in order to reduce the influence of the electric fields between top and bottom electrode.

Figure 14:
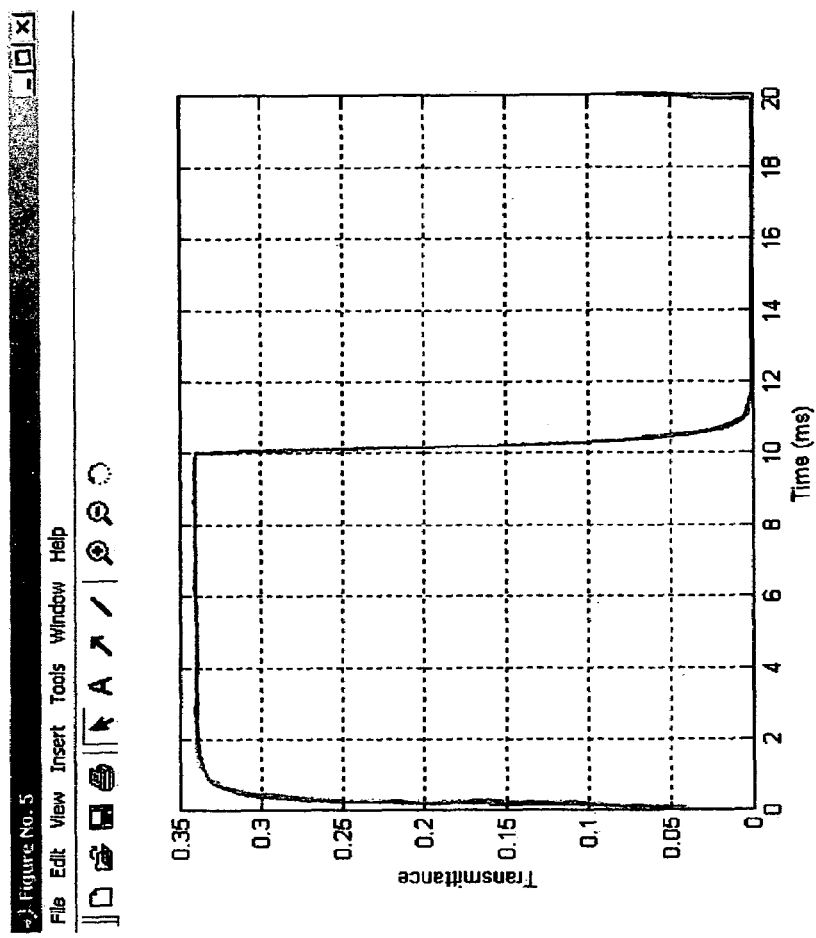
FIG. 14 shows the simulated optical response of the present invention with asymmetric upper and lower electrode and narrower electrode width and gap of 2 micrometers (μm).
Figure 15:
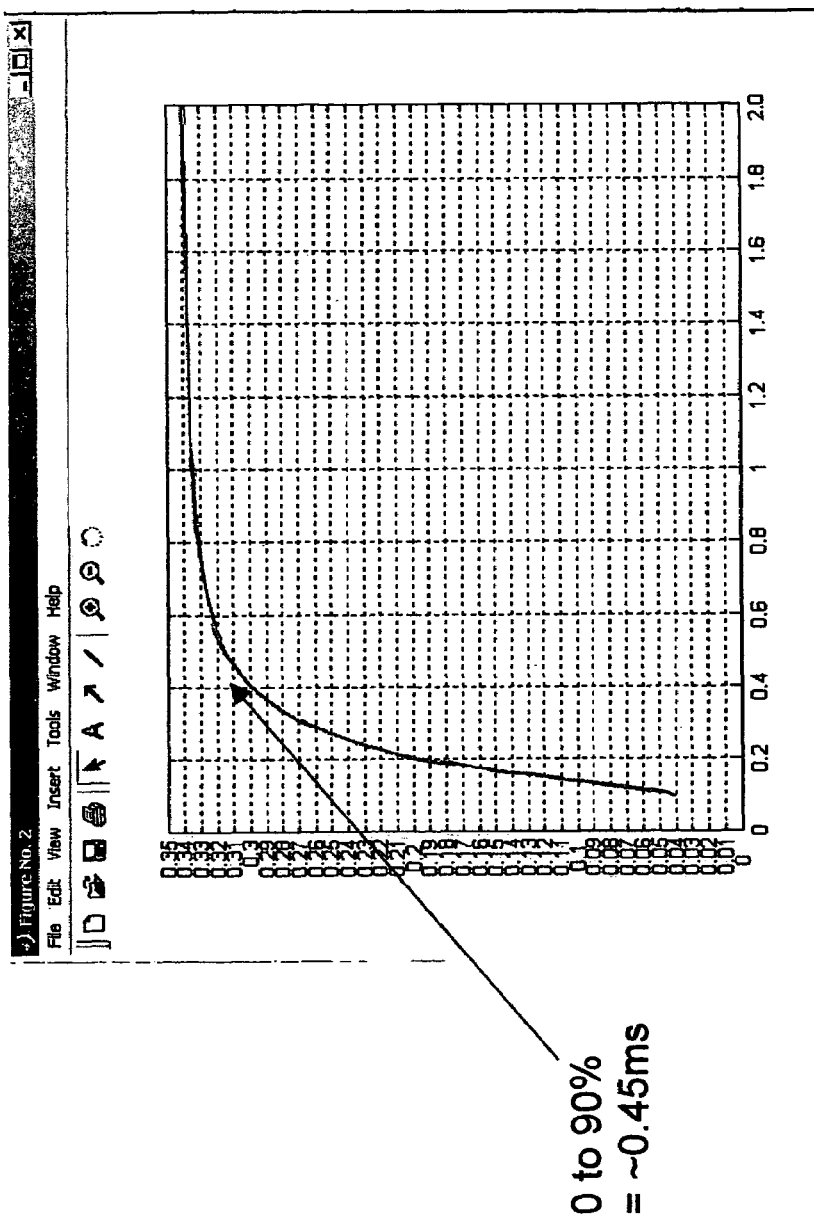
FIG. 15 shows the rise time of the simulated optical response in FIG. 14.
Figure 16:
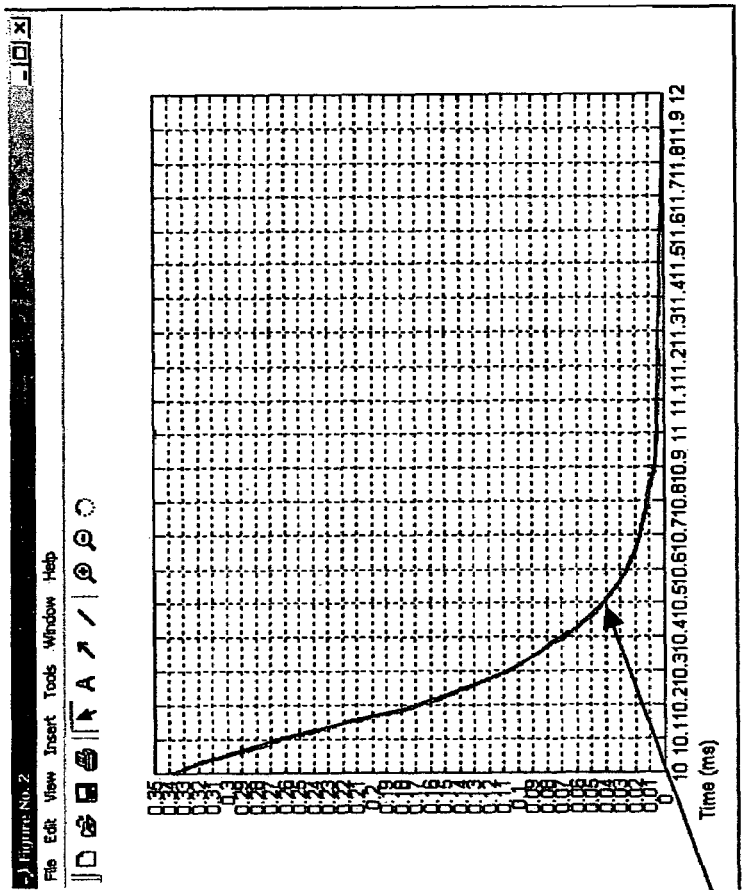
FIG. 16 shows the fall time of the simulated optical response in FIG. 14.
Figure 17:
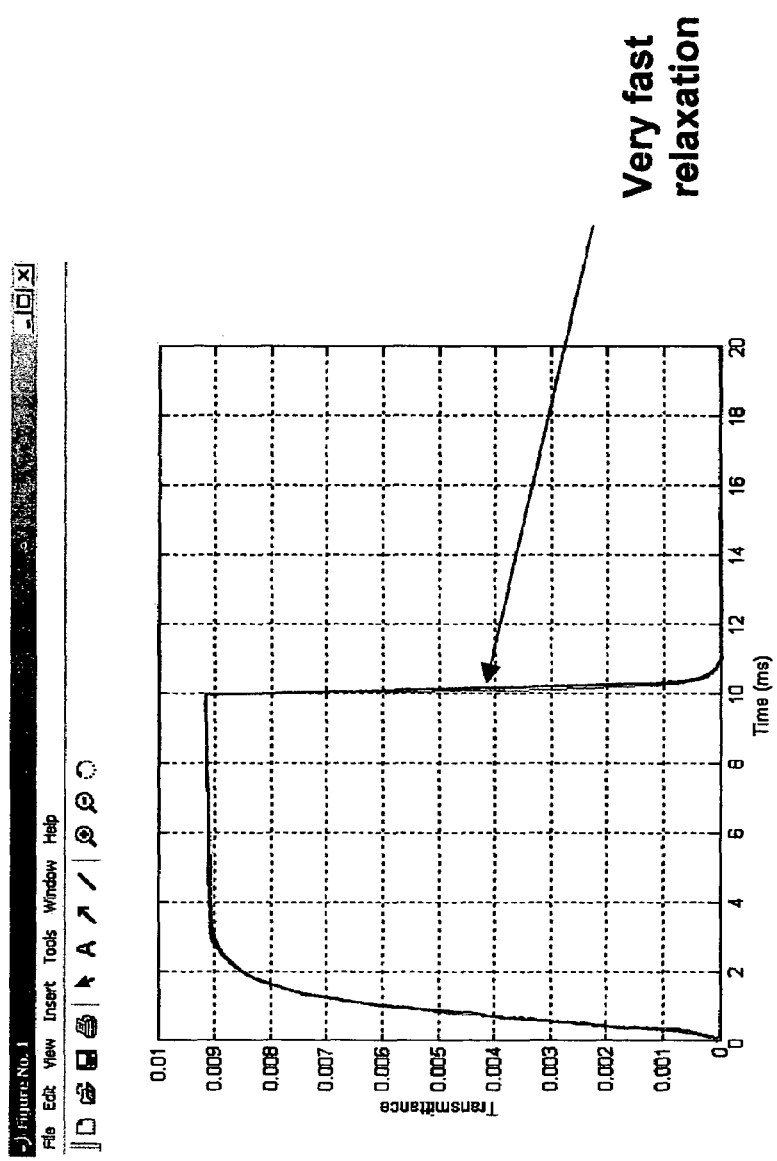
FIG. 17 shows the simulated optical response of the device in FIG. 14 at 2 Volts (V).
Figure 18:
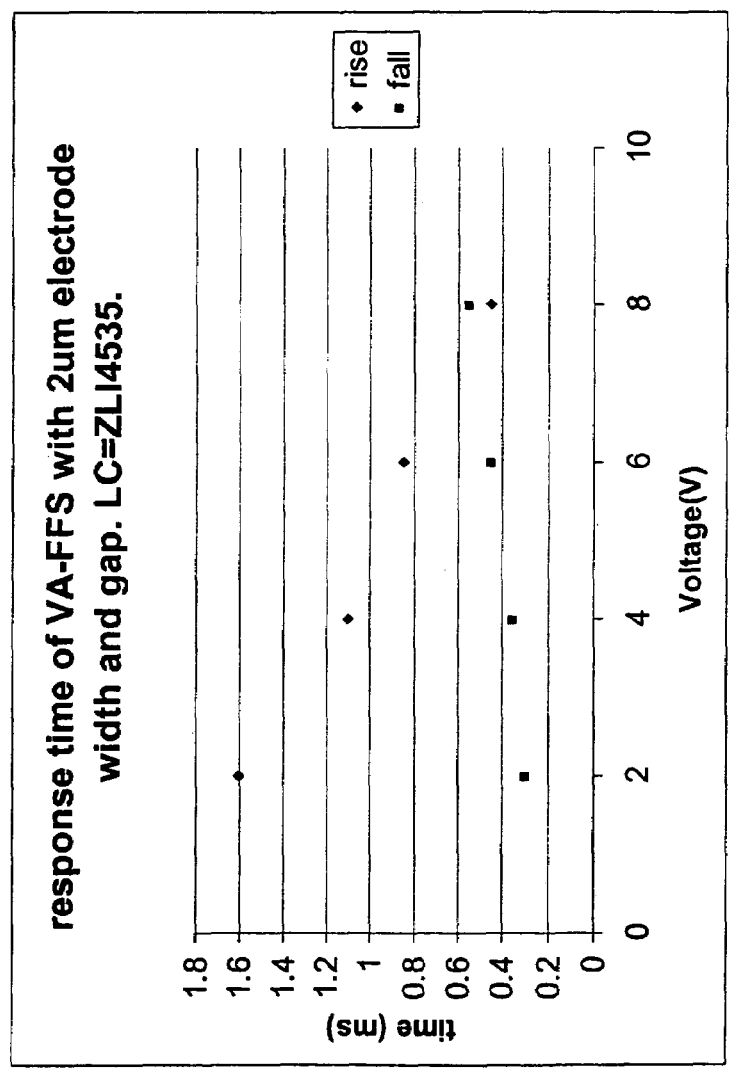
FIG. 18 shows the rise and fall times of the device in FIG. 14 at different applied voltages.

By using W=G=2 μm, the response time can be reduced even further at the expense of higher applied voltage. For example, the electro-optic response of a device using asymmetric upper and lower electrodes with W=G=2 µm is shown in FIG. 14. The rise and fall times are only ~0.45 ms and ~0.55 ms as shown in FIGS. 15 and 16. The LC is ZLI4535 with Δn=0.4 and transmission reaches maximum at almost 100% at the applied voltage of 8V. FIG. 17 shows the optical response of the device when it is under an applied voltage of 2V. As can be seen from the figure, this liquid crystal mode offers unusual fast relaxation even at very small applied voltages. In fact, the relaxation time (fall time) becomes shorter at lowered applied voltage since the molecular perturbation becomes smaller at lower applied voltage. FIG. 18 shows the rise and fall times of the device at different applied voltages. As can be seen from the plot, both rise and fall times are very fast <2 ms even at low applied voltages. The relaxation time becomes shorter as voltage is lowered due to lower molecular perturbation whereas rise time increases as voltage is lowered due to lower applied electric field; rise time is field-driven.

Figure 19:
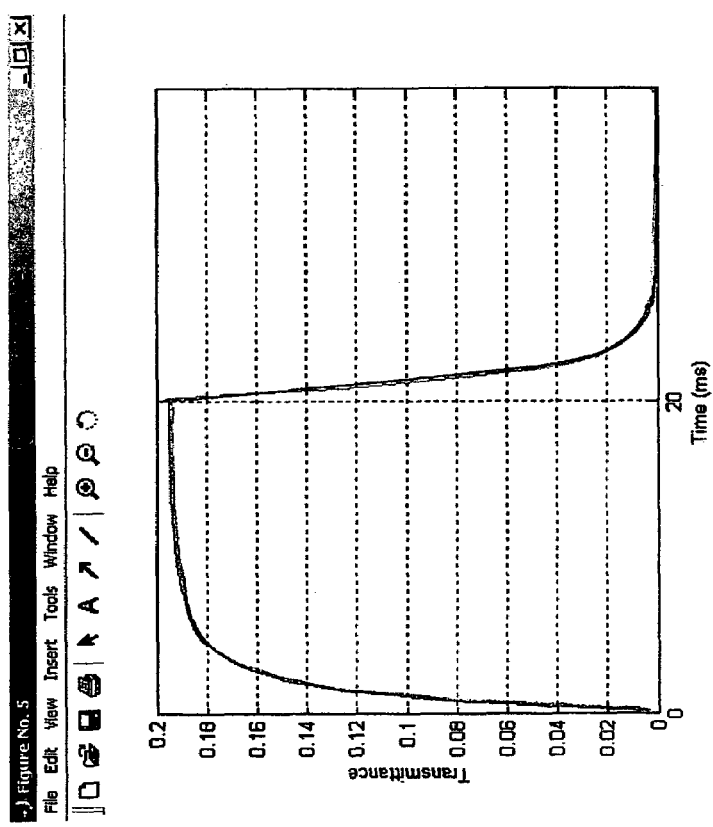
FIG. 19 shows the simulated optical response of the present invention with lower electrode only and wider electrode width and gap of 5 μm.
Figure 20:
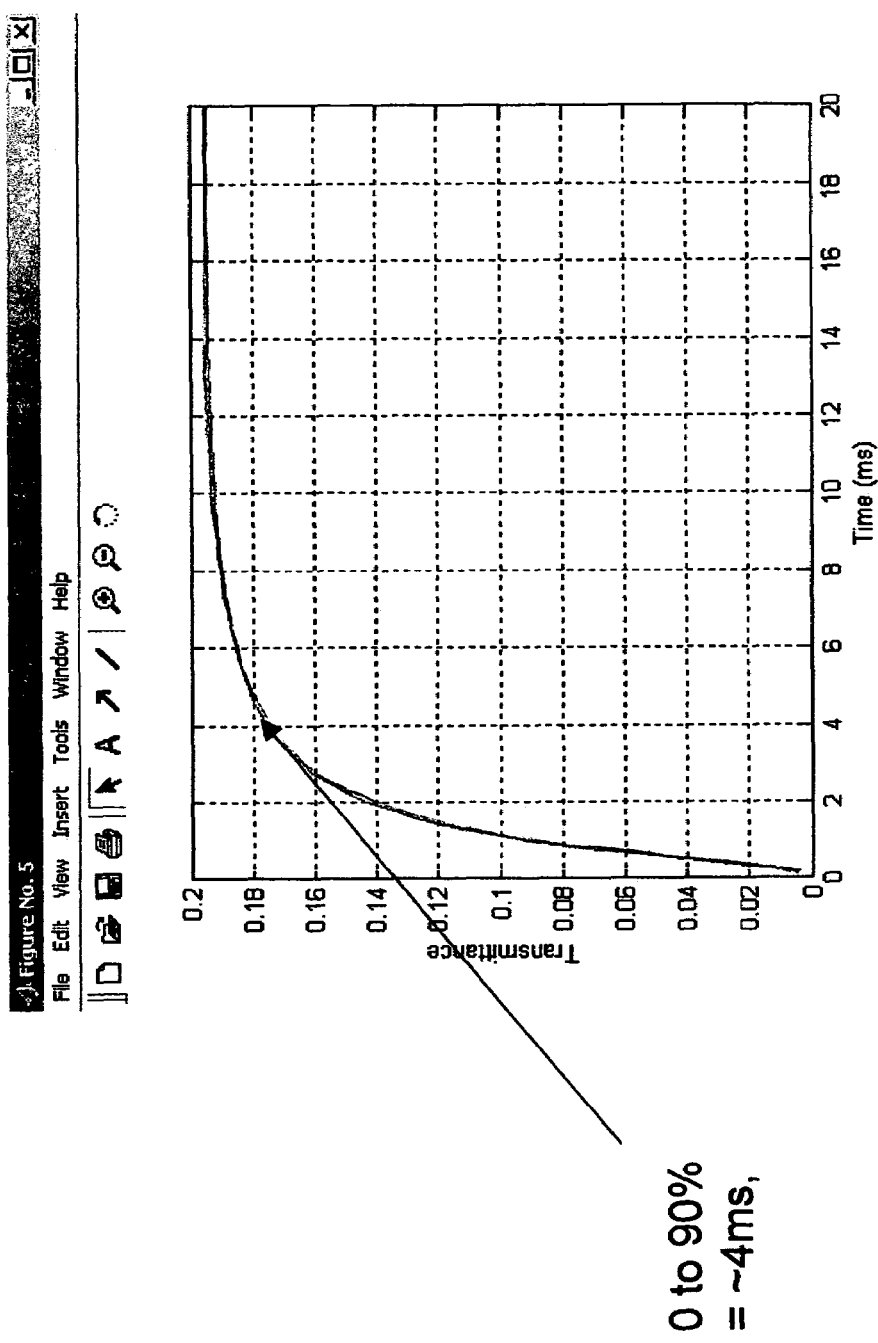
FIG. 20 shows the rise time of the simulated optical response in FIG. 19.
Figure 21:
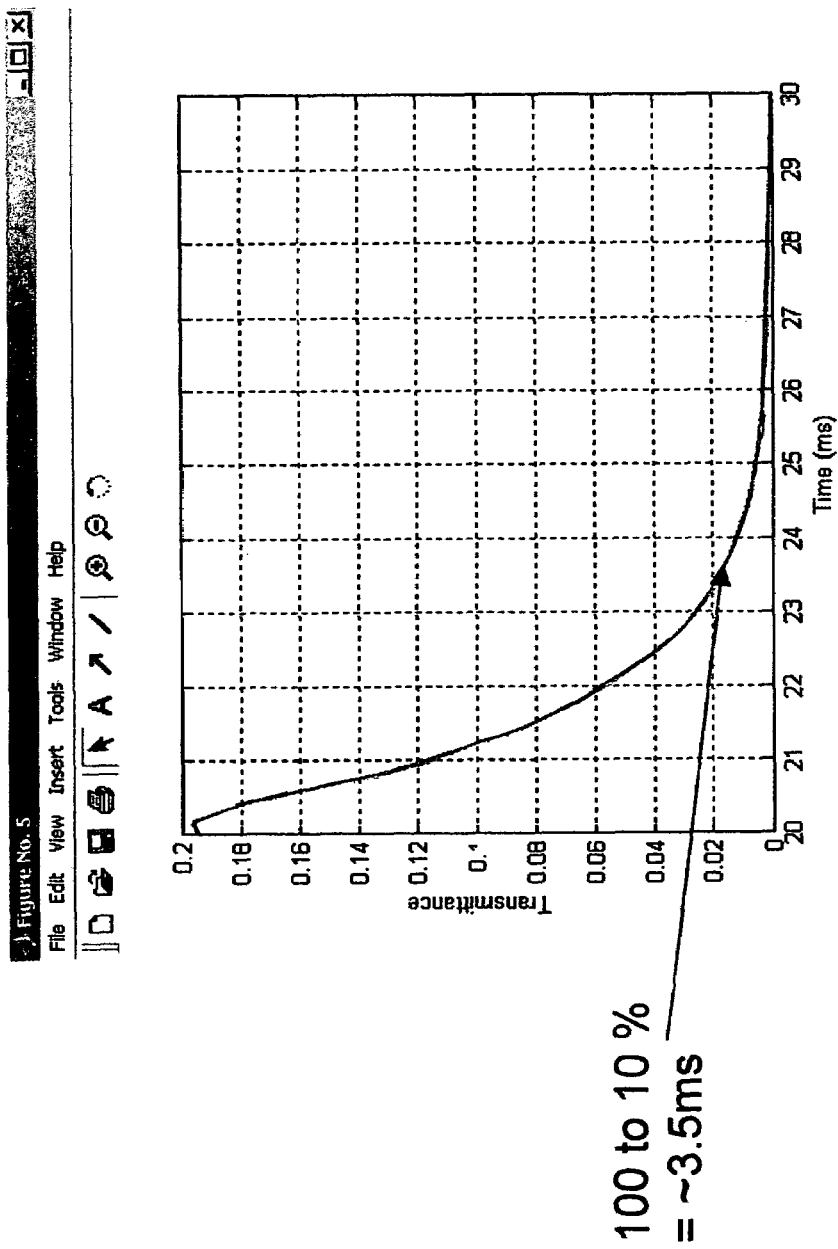
FIG. 21 shows the fall time of the simulated optical response in FIG. 19.
Figure 22:
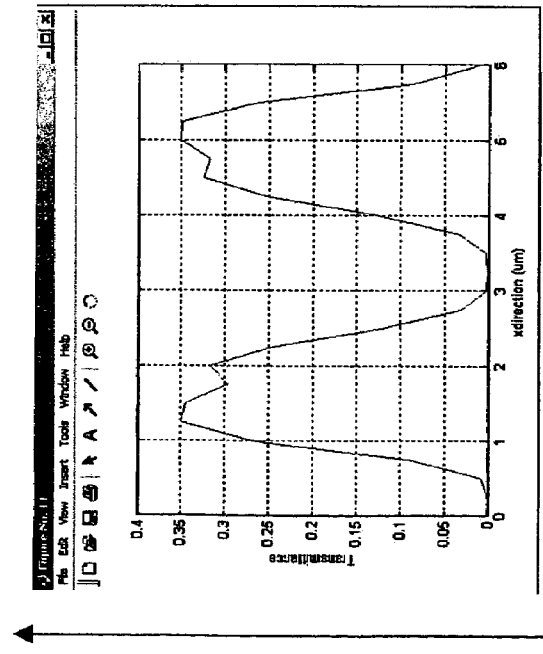
FIG. 22A shows the transmission profile of the present invention with lower electrode only.
FIG. 22B shows the director distribution of the present invention with lower electrode only.
Figure 22:
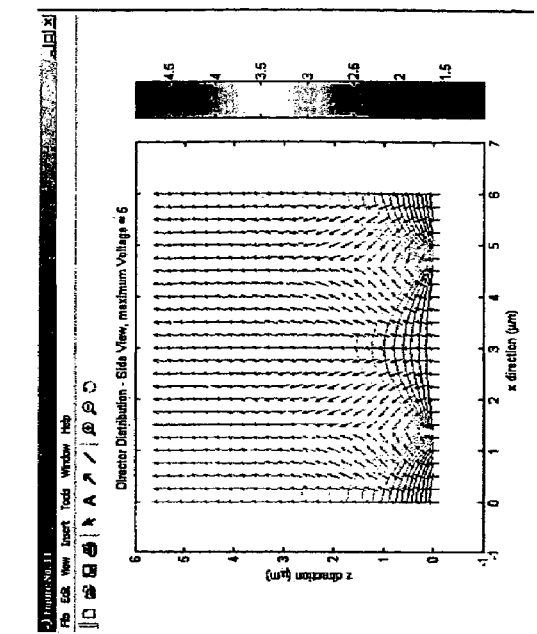
Figure 23:
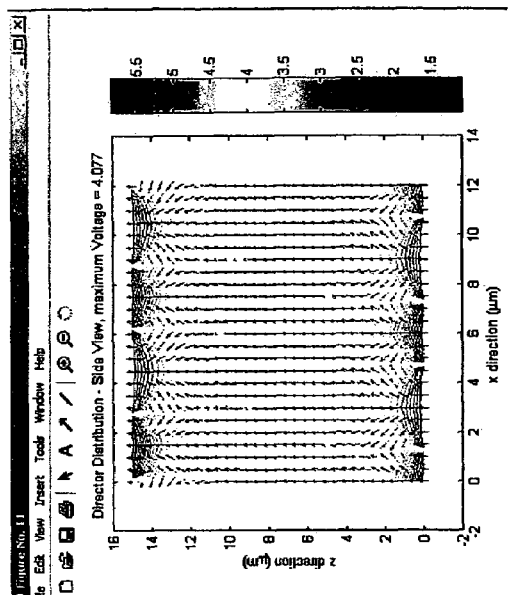
FIG. 23A shows the transmission profile of the present invention with asymmetric upper and lower electrode.
FIG. 23B shows the director distribution of the present invention with asymmetric upper and lower electrode.
Figure 23:
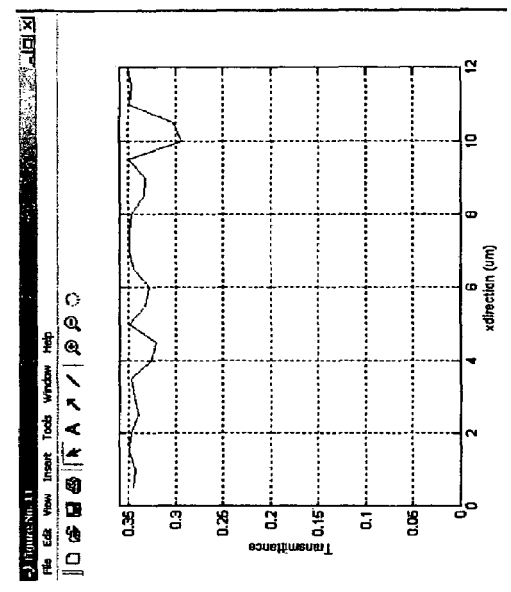

FIG. 19 shows the optical response of a device when the electrode width W and gap G are=5 µm. In this example, only a lower electrode was used. FIGS. 20 and 21 show that the rise and fall times of the devices are still very fast at ~4 ms and ~3.5 ms respectively. The transmission of a 10 µm thick device is ~20/35=~57% at an applied voltage 6V. Δn of the LC used is 0.2 and other physical parameters of LC are taken as those of ZLI4535. Higher transmission is possible by including an upper electrode. These results can be important for manufacturers where the fabrication capability of narrow pixel electrode is more limited.

The optical response of the device for intensity modulation has been demonstrated. However, phase modulation is often required for optical communication applications. The fact that the amount of induced phase shift for phase modulation is proportional to the amount of induced retardation for the intensity modulation suggests that we can deduce the phase modulation capability of the device by analyzing the intensity modulation behavior. In general, intensity modulation operates when the device is placed between crossed polarizers and that the incident beam is polarized at 45° relative to the plane of optic axis rotation. Incident light experiences both ordinary and extraordinary indices $n_o$ and $n_{e(eff)}$. Upon an applied voltage, transmission changes from 0 to 100% when a π optical retardation is induced. This π optical retardation however becomes a π pure phase-shift when the device operates in the phase modulation mode, which occurs when the incident beam is polarized along the plane of optic axis rotation, instead of 45° as for intensity modulation. Thus, the incident beam experiences $n_{e(eff)}$ only. Therefore, a full intensity transmission in intensity modulation also corresponds to a π phase shift in phase modulation.

In general, if the transmission profile is examined across a pixel in the device of the present invention with lower electrode only, it has a rather non-uniform output profile as shown in FIG. 22A. This is due to the non-uniform switching of LCs caused by the disclinations and the generated electric field pattern as shown in simulated director distribution in FIG. 22B. This non-uniformity is acceptable for applications such as displays where the intensity of a pixel perceived by the human eyes is spatially averaged. However, for phase modulation, this non-uniformity corresponds to non-uniform phase shift across the pixel. Better uniformity is desired in order to maximize the phase modulation efficiency. By using asymmetric upper and lower electrodes, the transmission profile becomes much more uniform as shown in FIG. 23A. This happens as a result of the compensation offered by the upper electrode. Simulated director distribution of a LC device with asymmetric upper and lower electrodes is shown in FIG. 23B. Further improvement of the uniformity may be obtained by careful design and optimization of the electrode.

The transmission shown in FIG. 23A is ~100%, since 0.35 transmission on the figure corresponds to 100% normalized transmission, which corresponds to a π pure phase-shift or phase modulation. The pixel electrode width W and gap G are both 2 µm. The applied voltage is 8V with Δn of LC=0.2 at wavelength of 550 nm. By using Δn=0.4, a 2 π phase shift may be obtained. To obtain a 2π phase shift at 1550 nm infrared region, further improvements on the device design or LC birefringence may be required.

Due to the mirror symmetry of the molecular switching which results in multi-domain formation, this liquid crystal mode has inherent wide-viewing-angle property, which is a very desirable property for display applications.

Other potential applications for the present invention include, but are not limited to, optical-phased-arrays for beam-steering, high-speed color sequential displays, TV displays with fast response and wide-viewing angle. Those skilled in the art will perceive additional applications when the advantages of the present invention are discussed in view of current technology.

The present invention provides a faster response that the Fringing-Field-Switching liquid crystal mode and the Vertical-Alignment-In-Plane-Switching mode. The present invention is more stable and does not require bias voltage, as does the Optical Compensated Bend liquid crystal mode. With regard to conventional liquid crystal cells which can have Vertical Alignment (VA), Parallel Alignment (PA), or Twisted Nematic (TN) cells that require a thin cell gap structure; the present invention does not require a thin cell gap.

Thus, the present invention provides a unique structure, the Vertically Aligned-Fringing Field Switching (VA-FFS) liquid crystal mode capable of generating very fast optical modulation without the use of a very thin cell gap. Fast relaxation occurs even at very low applied voltages and the operation is very stable. The end result is a fast response liquid crystal mode to meet the demand and use in advanced display systems and optical communication systems.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of producing a stable, fast-response optical modulator with vertically aligned (VA) fringing field switching (FFS) liquid crystals, comprising the steps of:
   a) forming a top substrate and a bottom substrate capable of supporting a top and bottom common electrode, respectively, connected to a voltage source,
   b) placing a nematic liquid crystal layer between the top and bottom substrate of (a) so that the molecules of said crystal are vertically aligned when there is no voltage applied,
   c) including top and bottom pixel electrodes on the top and bottom substrates, respectively, next to the liquid crystal layer, said pixel electrodes having discontinuous and narrow segments, wherein the top pixel electrodes are parallel to the bottom pixel electrodes; and d) connecting the top and bottom pixel electrodes of c) to a voltage source; and e) providing insulation between the top and bottom pixel electrodes and the top and bottom common electrode with a passivation layer; whereby intensity and phase modulation for displays and optical communication are accomplished.

2. The method of claim 1, wherein the pixel electrodes are in segments having a width (W) and a space between segments forming a gap (G).

3. The method of claim 2, wherein W and G have the same value.

4. The method of claim 2, wherein W and G are below approximately 7 micrometers ($\mu$m).

5. An optical response device for producing stable, fast-response optical modulation comprising:

a top substrate and a bottom substrate having a top common electrode and a bottom common electrode connected to a voltage source and adjacent to the top substrate and bottom substrates, respectively, nematic, vertically aligned liquid crystal (LC) molecules, self-imposed strong boundary layers provided by unswitched LC molecules, fringing field switching in the operational mode, a top pixel electrode and a bottom pixel electrode having a voltage connection, wherein the bottom and top electrodes are discontinuous and are aligned symmetrically parallel to each other, and a passivation layer.

6. The optical device of claim 5, wherein the self-imposed strong boundary layers comprise unswitched LC molecules being held in a stationary position by adjacent fringing field switching molecules interacting with a generated electric field above the pixel electrode.

7. The optical device of claim 6, wherein the fringing field switching occurs in very thin horizontal sections that are perpendicular to the vertical alignment of the LC molecules.

8. The optical device of claim 7, wherein the fringing field switching occurs in horizontal sections of less than approximately 3.5 $\mu$m in length.

9. The optical device of claim 5, wherein the pixel electrode consists of discontinuous and narrow segments.

10. The optical device of claim 9, wherein the discontinuous and narrow segments include:
a narrow width (W) of less than approximately 7 $\mu$m; and
a narrow gap (G) of less than approximately 7 $\mu$m.

11. The optical device of claim 5, wherein the pixel electrode has a thin-film transistor for a voltage source.

12. The optical device of claim 5, wherein the bottom and top pixel electrodes are aligned symmetrically.

13. The optical device of claim 5, wherein the passivation layer separates the top and bottom pixel electrode segments from the top and bottom common electrodes adjacent to the top and bottom substrates.

14. The optical device of claim 13, wherein the passivation layer is an electrical insulating material.

* * * * *